United States Patent [19]

Haschke et al.

[11] 4,293,347

[45] Oct. 6, 1981

[54] PROCESS FOR DEPOLYMERIZATION OF ACRYLIC ACID POLYMERS

[75] Inventors: Elliot M. Haschke; Bennie J. Lewis, both of Lake Jackson, Tex.

[73] Assignee: The Dow Chemical Company, Midland, Mich.

[21] Appl. No.: 114,133

[22] Filed: Jan. 21, 1980

[51] Int. Cl.$^3$ .......................... B08B 3/08; B08B 7/00; B08B 9/08
[52] U.S. Cl. ................................. 134/11; 134/22 R; 134/31; 134/38
[58] Field of Search .................... 134/22 R, 38, 11, 31

[56] References Cited

U.S. PATENT DOCUMENTS

Re. 27,432  7/1972  Torrenzano et al. ............. 134/22 R
3,764,384  10/1973  Berni ................................. 134/22 R

*Primary Examiner*—Frank Sever
*Attorney, Agent, or Firm*—A. C. Ancona

[57] ABSTRACT

A method of removing acrylic acid polymer from processing vessels, e.g., distillation towers, which comprises contacting said polymer with a dialkyl phthalate in vapor or liquid form at elevated temperatures. This procedure dissolves and depolymerizes the polymer and removes it from the vessel.

5 Claims, No Drawings

PROCESS FOR DEPOLYMERIZATION OF ACRYLIC ACID POLYMERS

BACKGROUND OF THE INVENTION

In the purification of polymerizable vinyl monomers, there is a tendency for polymer to form on the internal surfaces of the distillation column and associated heat exchange vessels and piping.

Eventually, polymer buildup completely plugs the tower or decreases its efficiency significantly. Present methods available for cleaning distillation towers involve removing packing and/or hydroblasting the packing and internal walls in-place. Time lost from production is costly and labor costs are considerable. For some polymers, the complete replacement of column internals is the only way to remove them.

In the purification of acrylic acid, the polymer buildup is particularly difficult to remove. There may also be copolymers formed which include aldehydes. The crosslinked polymers and copolymers are especially insoluble. The homopolymer of acrylic acid which forms has a variety of physical forms, some of which are highly insoluble. The polymer may form as a thin film around the walls of the column where condensation in the absence of inhibitor occurs or may form as small masses throughout the packing in the shape and size of "popcorn". The polymer may also be clear and gel-like or a hard, white, opaque mass. Color is generally clear or white. However, in areas near the bottom of the column, the polymer may be brown to black in color where decomposition products have concentrated.

Although the low molecular weight polymer of acrylic acid is readily water soluble, under harsh conditions, i.e., too high a temperature and/or low amounts of inhibitor, the insoluble polymers will form. The common organic and inorganic solvents will not dissolve the polymer formed in columns. Thus, it would be very desirable to find a method which would remove such polymers effectively in-place, i.e. without removing any of the column internals, and with a minimum of downtime for the equipment.

It has now been found that certain dialkyl phthalates will dissolve and/or decompose these objectionable polymers.

SUMMARY OF THE INVENTION

The polymers of acrylic acid which form in apparatus employed during the purification of the acid by distillation is removed by contacting said polymers at elevated temperatures with certain lower dialkyl esters of phthalic acid.

DETAILED DESCRIPTION OF THE INVENTION

The polymers of acrylic acid which form on the walls, trays and packing of distillation columns during its purification can be dissolved and depolymerized by heating in the presence of dialkyl phthalates at a temperature within the range of about 275° to about 325° C.

Particularly effective are dimethyl, diethyl and dibutyl phthalates which are employed by contacting the polymers with these esters at or near their reflux temperatures at atmospheric pressure. Other useful dialkyl phthalates are those in which the alkyl groups contain from one to four carbon atoms, including the mixed esters such as methyl ethyl phthalate, ethyl butyl phthalate and methyl propyl phthalate. The esters are placed in the reboiler vessel and heated to reflux temperature so that vapor and liquid may contact and penetrate the polymer on the walls and in the packing of the distillation equipment.

The following is a step by step method indicating how insoluble acrylic acid polymer may be removed from a distillation column or similar vessel.

(1) Acrylic acid or mixtures thereof with by products must be removed from the reboiler section and sufficient quantities of dimethyl phthalate added to operate the reboiler. Removal of trace amounts of monomer in the tower is not necessary.

(2) Sufficient heat is added to the system to fill the entire column with phthalate ester vapors. Low boiling decomposition products should be taken overhead. However, the quantities of the ester taken overhead should be limited through proper reflux control.

(3) Reflux time of 1-5 hours is normally sufficient for depolymerization although longer periods may sometimes be required. After a cooling period and removal of the phthalate ester, the column may be started up and any remaining ester removed in the bottoms product.

Dimethyl and diethyl phthalates are equally effective in removing the polymers. While dibutyl phthalate is effective, it is preferred to employ it at temperatures slightly below its reflux temperature (325° C. atm.). Thus, reduced pressure is necessary in order to get the vapors to reflux. It was found that after prolonged heating at 325° C., this ester showed some decomposition.

Although less economical than employing the refluxing vapors, the entire column can be flooded with the liquid ester to accomplish the desired polymer removal.

During initial contact with the ester the polymer dehydrates and shrinks to a hardened mass. Upon further heating to the boiling point of the phthalate, the polymer begins to swell and eventually decomposes/dissolves with only small particles remaining, which are flushed from the column by refluxing liquid.

EXAMPLE 1

A glass column (1.5" I.D. ×3.5') was packed with stainless steel Pall rings (⅜") an acrylic acid refluxed therein at approximately 40 mm Hg. In order to simulate actual conditions of polymer formation in a column, small amounts of paraformaldehyde was added. A small amount of benzoyl peroxide was added to increase the polymerization rate. After 8 hours of reflux the column walls and packing were coated with polymer (273.1 g polymer).

A flask (500 ml) was attached to the bottom of the column and charged with dimethyl phthalate (372.2 g). The bottoms temperature was adjusted (285° C.) and dimethyl phthalate vapors were allowed to reflux 3.5 hours. Vapors containing water and acrylic acid monomer evolved from the head and were condensed.

After the reflux period, the column was allowed to drain and it was noted that the uppermost 5" of the column contained polymer in various stages of decomposition. The remainder of the column was polymer free.

An analysis of the bottoms of the column showed the following:

| | |
|---|---|
| Unknown low boiling products | 0.5 wt. % |
| Phthalic Anhydride | 2.42 wt. % |
| Dimethyl Phthalate | 89.12 wt. % |

| -continued | |
|---|---|
| High boiling Aliphatic polyesters | Balance |

Composition (as wt. %) of the total overhead product is shown in tabular form below:

| | |
|---|---|
| Formaldehyde | 0.775 |
| Methanol | 1.40 |
| Methyl Acrylate | 0.3 |
| $H_2O$ | 77.46 |
| Acrylic Acid | 17.46 |
| Acetic Acid | .051 |
| Methyl Benzoate | .046 |
| Dimethyl Phthalate | 2.78 |
| Other | 0.2 |

Diethyl phthalate performed similarly in tests performed as in Example 1. Polymer formed under actual distillation conditions in larger pilot plant equipment was removed and packed in laboratory columns. Treatment in like manner with dimethyl, diethyl and dibutyl phthalates effectively dissolved and decomposed these polymers.

The overhead product may be distilled to recover the acrylic acid and the bottoms distilled to recover the ester employed for the depolymerization. The latter may be recycled to the process.

We claim:

1. A method for removing polymers of acrylic acid from distillation vessels which comprises contacting said polymer with a solvent selected from the group of dialkyl phthalates wherein each alkyl group contains from one to four carbon atoms at a temperature which will decompose or dissolve said polymer without appreciable decomposition of said solvent.

2. The method of claim 1 in which the column is flooded with liquid solvent.

3. The method of claim 1 in which the solvent vapors are refluxed in the column.

4. The method of claim 2 or 3 wherein the temperature is maintained within the range of 275°–325° C.

5. The method of claim 1 or 4 wherein the lower dialkyl ester is the dimethyl, diethyl or dibutyl ester of phthalic acid.

* * * * *